May 28, 1963 F. N. BECKER 3,091,189
CONVEYOR
Filed Aug. 25, 1959 3 Sheets-Sheet 1

INVENTOR.
FRANCIS N. BECKER
BY Meyer, Baldwin, Doan & Young
ATTORNEYS

May 28, 1963 F. N. BECKER 3,091,189
CONVEYOR
Filed Aug. 25, 1959 3 Sheets-Sheet 2

INVENTOR.
FRANCIS N. BECKER
BY
Meyer, Baldwin, Doran & Young
ATTORNEYS

May 28, 1963    F. N. BECKER    3,091,189
CONVEYOR
Filed Aug. 25, 1959    3 Sheets-Sheet 3
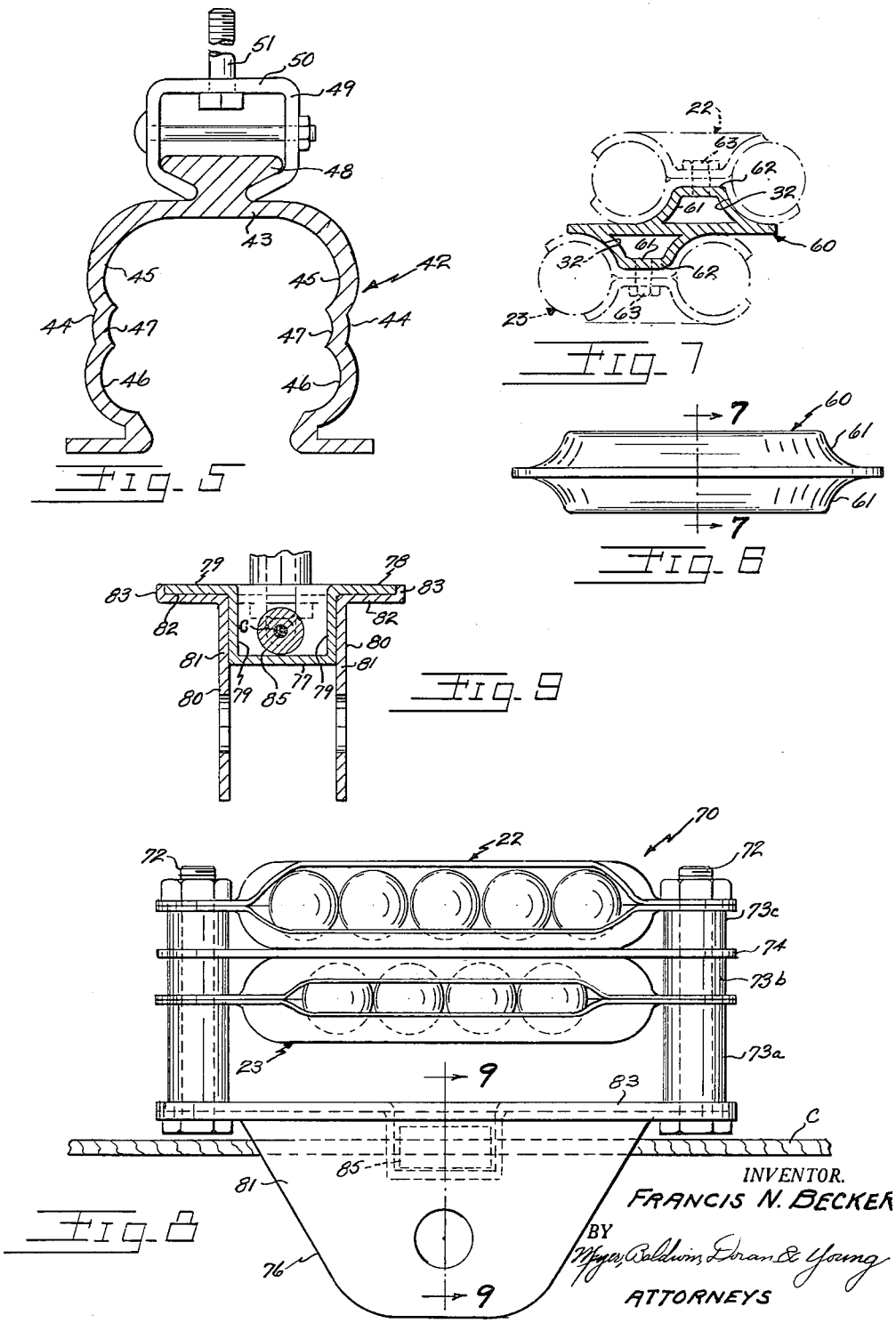
INVENTOR.
FRANCIS N. BECKER
BY
Meyers, Baldwin, Doran & Young
ATTORNEYS

United States Patent Office 3,091,189
Patented May 28, 1963

3,091,189
CONVEYOR
Francis N. Becker, Cleveland, Ohio, assignor to Becker Crane & Conveyor Co., Cleveland, Ohio, a corporation of Ohio
Filed Aug. 25, 1959, Ser. No. 835,996
9 Claims. (Cl. 104—94)

This invention relates to conveyors of the type utilizing a guide track upon which is movably carried one or more article carrier or trolley members.

One of the objects of the present invention is the provision of a novel and improved conveyor of the type referred to in which each of the article carrier or trolley members is movably supported on a plurality of separate load bearing trackways formed upon and extending longitudinally along the guide track.

Another object of the present invention is the provision of a novel and improved conveyor of the type referred to in which each of the article carrier or trolley members is provided with substantially frictionless bearing means, which are engageable with a plurality of separate load bearing trackways formed upon and extending longitudinally along the said guide track to thus provide for a frictionless support for said trolley member.

Another object of the present invention is the provision of a novel and improved conveyor of the type referred to and in which each of the article carrier or trolley members utilizes frictionless bearing means engageable with a plurality of load bearing trackways formed upon the guide track, and wherein the said trackways are disposed in at least two parallel spaced planes extending longitudinally along the said guide track.

Still another object of the present invention is the provision of a novel and improved conveyor as above defined, and wherein the frictionless bearing means on each of the trolley members has a plurality of generally planar endless ball bearing assemblies, the balls of each of said races being accommodated within and rolled along one of the said load bearing trackways, and thus progressively moved through its endless race as its trolley member is carried along the trackways to thereby provide substantially true frictionless engagement with said supporting trackways.

Another object of the present invention is to provide an article conveyor as above defined, and further characterized in that the trackways are disposed in transverse spaced relation to each other on opposite sides of the guide track, and wherein the balls of each of the planar endless races is accommodated within one of the said trackways.

Another object of the present invention is to provide a novel and improved conveyor of the type referred to, and wherein the frictionless bearing means on each of the trolley members comprises a plurality of planar endless ball bearing assemblies disposed in spaced parallel planes in an offset relation with respect to the center of the said trolley member, and wherein the balls of each of the races of said assemblies is accommodated within one of the said load bearing trackways.

Still another object of the present invention is the provision of an article conveyor as above defined and wherein the guide track is readily adapted to be bent in its longitudinal plane so as to enable the articles conveyed thereby to be transported in various preselected directions, such as is required for the transportation of articles between a plurality of stations in an industrial installation or the like.

Another object of the present invention is the provision of an article conveyor as above referred to, and wherein the guide track is adapted to be twisted in a plane or planes transverse to its longitudinal axis in such manner as to locate the trackways in opposed spaced relation to each other as to suspend the article trolley members in a downward or an upward direction or at any preselected angular position therebetween.

Still another object of the present invention is the provision of a novel and improved conveyor as above defined and wherein each of the trackways is in positive contact with its associated planar endless ball race to thus provide a frictionless support for its associated article trolley member in any of the aforesaid supported positions for said trackways.

Other objects and advantages of the conveyor of the present invention will be realized by one skilled in the art to which it pertains and upon reference to the following description of several preferred embodiments, and which are illustrated in the drawings accompanying this specification and wherein:

FIG. 5 is a second embodiment of guide track for the conveyor of the present invention, showing particularly a one piece cast construction for said track and means integrally formed therewith for anchoring the same to a suitable support;

FIG. 6 is an elevational view of a second embodiment of planar endless ball bearing assembly adapted for use with the article carrier or trolley member of the conveyor of the present invention;

FIG. 7 is a sectional view taken approximately on line 7—7 of FIG. 6 and shows, in particular, a one piece spacer plate adapted to properly position each of the planar endless ball race assemblies with respect to its associated grooved trackway in the conveyor guide track;

FIG. 8 is an elevational view of an article carrier or trolley member adaptable for use with either of the guide tracks of FIG. 2 or 5, and which trolley member is especially designed for use in a cable type of conveyor wherein a cable C is connected to each trolley member and utilized to provide the motive power to drive each of said trolley members along the supporting guide track;

FIG. 9 is a sectional view taken approximately on line 9—9 of FIG. 8, and showing in particular the means for anchoring the cable C to each of the trolley members and the preferred location for said cable relative to said trolley member and guide track.

Figure 1:
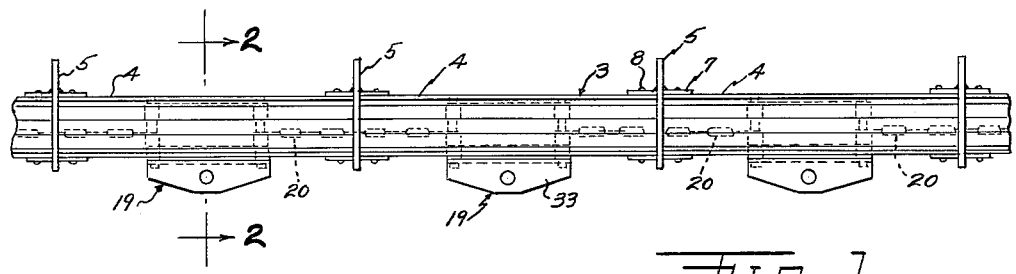
FIG. 1 is a fragmentary view in elevation of a first embodiment of conveyor embodying the concepts of the present invention.
Figure 2:
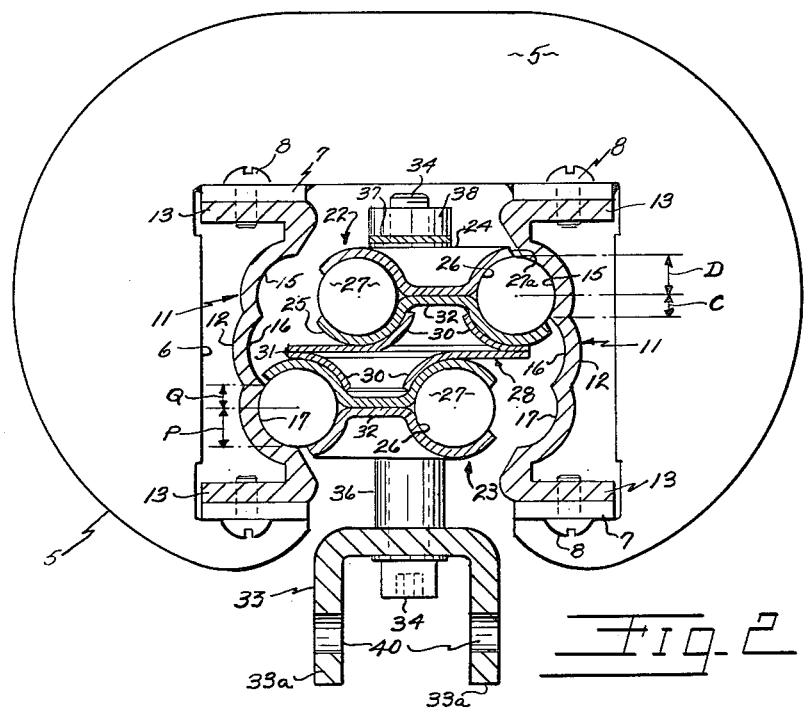
FIG. 2 is a sectional view taken approximately on line 2—2 of FIG. 1 and showing particularly the cross sectional configuration of the conveyor track having a plurality of grooved trackways and with one of the article carrier or trolley members being supported upon two of said trackways.

Referring now to the drawings throughout which like elements are referred to by the same reference character, the embodiment of conveyor as is shown in FIGS. 1-4 inclusive, includes a guide track identified in its entirety by the reference numeral 3, preferably being of cast construction of a suitable lightweight metal such as aluminum and which is seen to comprise a plurality of elongated track sections 4 disposed endwise to each other, the abutting ends of which are securely fastened together by means of connector plates 5. As best seen in FIG. 2, each of the connector plates 5 is preferably oval-shaped in configuration, having a centrally disposed cut-out portion 6. Pairs of lugs 7 are preferably welded to or cast integral with said plates on opposite sides of the cut-out portion 6 in such manner as to extend perpendicularly outwardly from the opposed surfaces of said plate and in substantial parallel spaced relation to each other. To connect the track sections 4 together in tandem relation, the abutting ends of adjacent track sections are preferably disposed within the central cut-out portion 6 of one of the connector plates 5, and securely fastened to the lugs 7 by means of fasteners such as screws 8. The conveyor as thus assembled, may then be suspended from a supporting structural member by means of hanger bars (not shown) each of which is adapted to be fastened at one end to one of the aforesaid connector plates 5 and at the opposite end thereof to the aforementioned structural support. In this manner the guide track may be suspended in any desired position adaptable to provide for the proper and efficient transportation of the articles to be conveyed thereby. For example, the conveyor assembly as shown in FIG. 1 is especially adapted to be suspended from an overhead support such as a ceiling joist or the like, so that the articles conveyed thereby hang vertically downwardly therefrom while being transported from one station to another by the said conveyor. As will also be hereinafter realized, the several embodiments of conveyor herein described may also be adapted to be supported so as to convey the articles carried thereby in a vertical or horizontal plane, or in any selective angular plane located therebetween.

As is best seen in FIG. 2, each of the track sections 4 consists of a pair of identically formed rail members 11, each of which comprises a central part 12 integrally connected at each of its ends with a shoulder 13.

The connector plates 5 are preferably connected to the abutting ends of adjacent track sections in such manner that the aforementioned fasteners 8 project through the lugs 7 and thence into the central part of the aforesaid shoulders 13.

Each of the rail members 11 is preferably attached to the aforesaid connector plates 5 such that the central rail part 12 is substantially opposite the central rail part of its companion rail member of said track section, in a predetermined spaced relation, as is seen in FIG. 2.

The central part 12 of each rail member 11, in the instant embodiment, is preferably shown to be provided with a pair of trackways, identified respectively by the reference numerals 15 and 17, which are preferably disposed on opposite sides of a groove 16 and which extend longitudinally along the aforesaid central part 12 in substantial parallel spaced relation one to the other. Each of said trackways, as is best seen in FIG. 2, is also shown to be arcuate or grooved in cross sectional configuration, the center of radius therefor being shown to be disposed in substantial alignment and equally spaced one from the other. In addition, the rail members 11 of each track section are so mounted, and the arcuate configuration of the trackways are such that opposed trackways of each section substantially face toward one another. That is to say, trackway 15 on one rail member, for example the right rail member, as viewed in FIG. 2, faces toward the trackway 17 on the left rail member. The arcuate configuration of trackways 15 and 17 on each of said rail members 11 preferably subtend an arc of approximately 120 degrees.

The instant embodiment of my improved conveyor also includes a plurality of article carrier or trolley members, each of which is identified in its entirety by the reference numeral 19, and which, as is best seen in FIG. 1, are interconnected together by means of suitable lengths of a tension member such as link chain indicated at 20, the latter in turn being connected to a suitable source of driving power (not shown), in a manner well known in the art, to thus provide for moving the trolley members 19 along the conveyor guide track 4.

With particular reference directed to FIG. 2, the instant form of trolley member 19 comprises a pair of planar endless ball bearing assemblies identified respectively by the reference numerals 22 and 23. Each of said assemblies is identical in construction, and therefore a detailed reference to the construction of merely the assembly 22 will be described herein.

Figure 3:
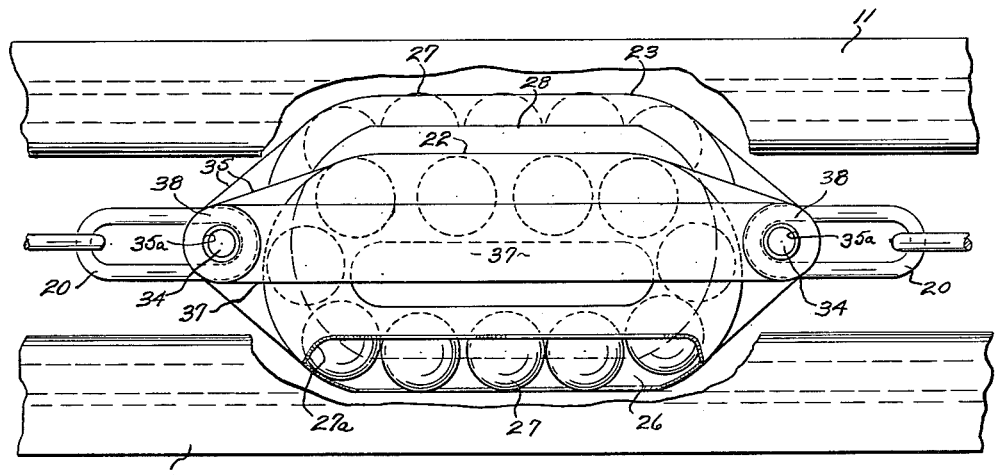
FIG. 3 is a fragmentary plan view of the conveyor of FIG. 1, with portions of the guide track cut away to show the position of each of the planar endless ball bearing races for the trolley member and the manner in which the balls of each of said races are positioned for engagement with one of the grooved trackways.

As is best seen in FIGS. 2 and 3, each planar ball bearing assembly comprises upper and lower housing parts 24 and 25 respectively, each of which is somewhat oval-shaped in configuration and provided along its periphery with a continuous outwardly projecting curved wall portion which, when said parts are secured to each other as shown in FIG. 2, define in endless oval-shaped raceway 26. Said raceway accommodates a plurality of hardened steel balls 27, and is partially opened along its periphery as indicated at 27a in FIG. 2, to thus permit the balls 27 to present a predetermined surface thereof for engagement with one of the aforesaid trackways, in a manner as will be hereinafter described. At the same time, the balls 27 cannot escape from raceway 26.

In the instant embodiment of trolley member, the ball bearing assemblies 22 and 23, are preferably mounted one above the other, the assembly 22 being hereinafter also referred to as the upper ball bearing assembly and the aforesaid assembly 23 as the lower of said assemblies.

For this purpose, a positioning plate 28 is utilized, the instant form being preferably of unitary construction and having a plurality of fingers 30 struck outwardly from a central flat portion, as identified at 31, said fingers being disposed in two separate groups, wherein the fingers of said groups extend outwardly in substantially opposite directions and from opposed surfaces from said flat central part, said groups of fingers, in turn, being in predetermined spaced relation to each other laterally of the longitudinal axis of said positioning plate. As best seen in FIG. 2, the positioning plate 28 is interposed between the upper and lower ball bearing assemblies 22 and 23, respectively, in such manner that the upwardly projecting group of said fingers extends into the recess 32 located centrally on the lower housing part 25 of the assembly 22, and the downwardly projecting group of said fingers similarly extends into the recess 32 thus formed on the upper housing part 24 of the assembly 23. Each of said fingers, in addition, is preferably of such curved configuration as to lie against the adjoining curved wall portion of its associated housing part to thus prevent said parts from moving thereon and also from becoming misaligned relative to the guide track when mounted in the latter.

Figure 4:
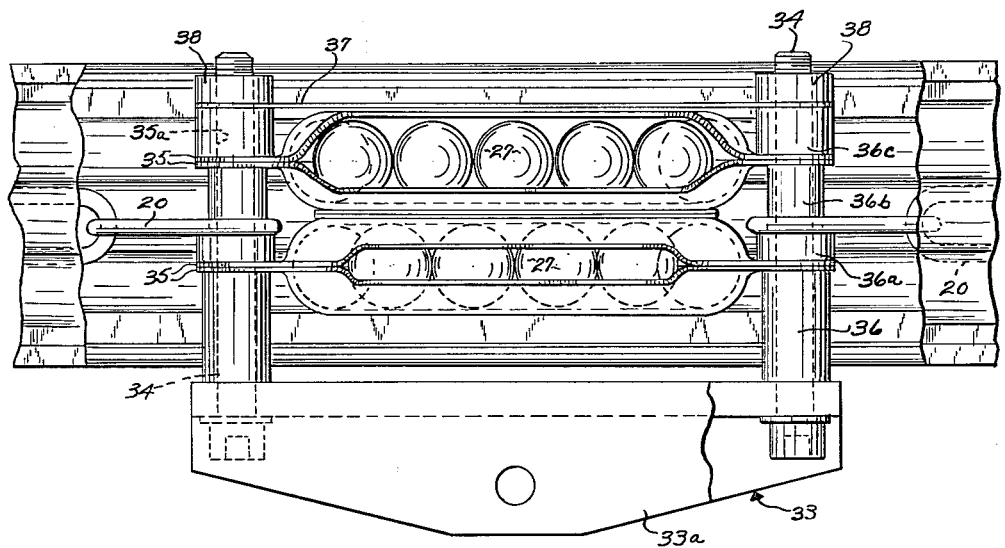
FIG. 4 is a fragmentary view in elevation of the conveyor of FIG. 1, being somewhat enlarged, and with the guide track being partially cut away to show the disposition of the planar endless ball race assemblies for each of the article carrier or trolley members within its associated grooved trackway formed on the aforesaid guide track.

The upper and lower ball bearing assemblies 22 and 23 are securely fastened to each other in the position as just described, and for this purpose, the instant form of trolley member 19 includes a hanger bracket 33 which is preferably of inverted U-shaped configuration as seen in FIGS. 2 and 4, and which centrally mounts a suitable anchor pin 34 at each of its ends. Each of the housing parts of the aforesaid race assemblies 22 and 23 is integrally provided with an ear 35 at each of its ends and which in turn is seen to be centrally apertured as indicated at 35a. As is best seen in FIG. 3, the ears 35 are formed on the aforesaid assemblies closely adjacent opposed longitudinal edges thereof in such manner that with said assemblies being disposed on either side of the positioning plate 28, the apertures 35a are in substantial alignment. The race assemblies are mounted on the anchor pins 34, the latter passing upwardly through said apertured ears, and suitable bushings, as indicated by the reference numerals 36, 36a, 36b and 36c respectively, are preferably mounted on each of the aforesaid pins 34 so as to be interposed between the ends of the hanger bracket 33 and said ball race assemblies to thus maintain said trolley member components in their preselective positions. In this manner said race assemblies are disposed in substantial parallel spaced relation to each other and the balls of said assemblies are also movable within parallel spaced planes. In addition, if so desired, a substantially flat cover plate 37 may be placed over the upper race assembly 22, its ends being mounted on the aforesaid pins 34 and the projecting ends of the latter, in turn, threadably mounting a suitable nut 38 or the like to thus securely fasten the aforesaid trolley member's components as just described in a unitary construction.

With reference now directed to FIG. 2, the trolley member 19 as just described, is of such configuration and size that when placed between the rail members 11 of the guide track 4, the balls 27 of the upper race assembly 22 are rotatably accommodated within the trackway 15 in the right hand rail member. Said trackway having a portion identified by the reference character C in FIG. 2, providing a load bearing surface, and also a somewhat larger portion, as identified by the reference character D, extending partially around and over said balls 27, said latter portion being defined as a retention portion to prevent said balls from being lifted out of the trackway as a result of for instance, a force being applied to the trolley member in an attempt to swing the same counterclockwise. In like manner, the balls of the lower assembly 23 are accommodated within the trackway 17 on the left hand rail member, said trackway also having a lower portion P defined as the load bearing portion and an upper portion Q identified as the retention portion.

As will be realized, the arcuate curvature of the aforesaid trackways is preferably of such radius as to contact the balls 27 of the race assemblies throughout substantially the entire exposed surface thereof to thereby provide for maximum load bearing and retention surfaces thereon.

As viewed in FIGS. 2 and 3, the endless raceway 26 for each of the race assemblies 22 and 23 is also of such configuration as to permit the balls 27 carried therein to roll and thereby travel around said raceway as the trolley member is moved along the guide track. In this manner, each of said balls is successively and periodically actively engageable with its associated trackway and hence wears at a substantially even rate to thereby prolong the life span of the trolley member.

As seen in FIG. 4, the link on each end of each of the aforesaid link chains 20, interconnecting the trolley members in the instant conveyor embodiment, is shown to be preferably extended around the anchor pin 34 adjacent thereto, being preferably disposed between the bushing members 36a and 36b thereof to thus provide for the application of a pulling force substantially at the center of the trolley member. With this arrangement, therefore, the lengths of link chain 20 are movable within the confines of the guide track, preferably between the trackways 15 and 17 on the rail members 11; the centrally located trackway 16 on each of said rail members facing each other thereby provide a zone for the purpose of accommodating said chain. The link chains 20 interconnecting said trolley members are also preferably taut to thus prevent the chain elements thereof from hanging below the guide track and perhaps interfering with the operation of said conveyor.

As seen in FIGS. 2 and 4, with each of the trolley members mounted within the guide track 4 as just described, the hanger bracket 33 is suspended vertically downwardly therefrom and the side arms of said bracket, as indicated at 33a, are centrally provided with an aperture as indicated at 40 which is adapted to accommodate a suitable article hanger (not shown) which in turn, is adapted to adequately support an article to be conveyed by the instant conveyor embodiment.

In FIG. 5, a second embodiment of guide track is shown, being identified in its entirety by the reference numeral 42, and which is shown to be of one-piece cast construction, being also preferably formed of a light metal such as aluminum. Although not herein shown, the instant guide track 42, as in the previous embodiment, also comprises a plurality of identical track sections similarily mounted endwise to each other to thereby provide a continuous conveyor assembly. Each track section is shown to be substantially of inverted U-shaped cross-sectional configuration having a central base portion 43 integrally connected at each of its ends to a depending rail member 44. As in the previous embodiment, each rail member, on its inner face, is provided with a plurality of trackways, the instant embodiment preferably having a pair of said trackways as identified by the reference numerals 45 and 46, which are disposed on either side of a shallow groove 47 and which, in addition, extend longitudinally therealong in substantially parallel spaced relation. Each of said trackways is shown to be arcuate in cross-sectional configuration, preferably subtending an angle of approximately 120 degrees, the centers of radii therefor being also disposed in substantial vertical alignment with each other. As in the guide track of FIG. 2, each of said trackways, when accommodating the ball race assemblies of the trolley members, has a load bearing portion partially underlying said balls, and a retention portion partially overlying the latter.

The base part 43 of each track section is shown to be integrally provided with an upstanding substantially V-shaped anchoring lug 48 which is adapted to be firmly grasped by the arms of a suitable hanger bracket 49, the latter in turn being adapted to be attached at its base part 50 by means of fastener 51 to a suitable structural support (not shown) to thus suspend the assembled conveyor guide track in a preselective position from said structural support.

In FIGS. 6 and 7 inclusive, I have shown a second embodiment of positioning plate which may be used in place of plate 28 in a like assembly, and which is herein identified in its entirety by the reference numeral 60. The instant form of positioning plate differs from the previous embodiment in that in place of the upstanding fingers 30, the instant plate has an elongated projection 61 extending outwardly from each of its spaced faces, the configuration of each of which is substantially the same as that of the recess 32 provided in the housing parts of the assemblies 22 and 23. Each of said projections is substantially conical shaped in cross-section, being closed at its end remote from said plate to define a substantially flat wall 62. Said projections are also spaced from each other laterally of the positioning plate and extending in substantial parallel spaced relation therealong.

With reference directed particularly to FIG. 7, wherein I have shown the ball bearing assemblies 22 and 23 of the trolley member in dot dash lines, the instant form of positioning plate 60 is therein adapted to be interposed between said assemblies such that the projections 61 are extendable into the recesses 32 of the adjoining housing parts of said assemblies. Suitable fasteners 63 carried in each of said assemblies are adapted to be threadably engageable with the flat wall 62 of the associated projections to thus securely fasten each of said assemblies to the positioning plate 60, in a similar relation to that in the previous form.

In FIGS. 8 and 9, another embodiment of trolley member is herein shown, being identified in its entirety by the reference numeral 70, and which also may be used in conveyor systems incorporating the concepts of the present invention and which is adapted to coact with a guide track configuration of either that shown in FIG. 1 or FIG. 5.

With reference directed particularly to FIG. 8, the instant form of trolley member 70 is especially designed for use in conveyor systems which utilize a cable, identified by the reference character C, as the means for pulling the trolley member along the guide track.

Specifically, the trolley member 70, in its present form, is somewhat similar to the trolley member 19 utilized in the previous conveyor embodiment in that it is provided with a pair of ball bearing assemblies identical to the assemblies 22 and 23 and therefor identified by the same reference numerals.

As in the aforesaid previous embodiment, the ball bearing assemblies 22 and 23 are also mounted upon and thus suspended between anchor pins 72, carried in the ends of a hanger bracket 76.

A positioning plate may also be interposed between the aforesaid assemblies to thus properly position the same for engagement within the arcuate trackways of the guide track, said plate being identified in its present form by the reference numeral 74, and which may be of the general configuration shown either in the embodiment of FIG. 2 or of FIG. 7. The instant form of plate however, differs specifically from the previous embodiments in that the ends thereof are mounted upon the aforesaid anchor pins 72 to thus provide a substantially more rigid assembly. Suitable bushings as indicated at 73a, 73b and 73c are also preferably mounted on each of said pins, being interposed between the ends of the positioning plate and ball bearing assemblies to thus properly position the latter for engagement with the said trackways of the guide track.

As previously mentioned, the instant form of trolley member is especially designed for use in conveyor systems which utilize a cable C as the driving means, wherein each of the trolley members of said system is connected to said cable and carried thereby along the guide track.

To accomplish this, the instant form of hanger bracket 76 as seen particularly in FIG. 9, includes a box-like member 77 integrally formed with a flap 78, on each of its sides, the latter extending perpendicularly outwardly from the upper edge of each of the upstanding side walls 79 thereof. An inverted L-shaped bracket, as indicated at 80, has its one leg 81 disposed against the outside surface of each of the aforesaid side walls 79 of said box-like member 77, in such manner as to extend downwardly therefrom as viewed in FIG. 9 in substantially parallel spaced relation. Each of said brackets is also formed with a somewhat shorter leg 82 which projects outwardly from the upper end of said one leg 81, and which closely underlies the underside of one of the aforesaid flaps 78 of said member 77. As is also best seen in FIG. 9, each of the shorter legs 82 of each bracket 80 is preferably formed with a narrow upstanding lip portion 83 which is adapted to extend around and embrace the outermost edge of the aforesaid flap 78 to thus retain the box-like member substantially centrally between the said brackets.

To connect each of the trolley members of the conveyor system to the aforesaid cable C, a cylindrical sleeve 85 is threaded upon said cable and securely fastened at spaced intervals therealong. If so desired, said sleeve may be formed of any suitable soft metal and fabricated directly on said cable by swaging, or the like. Each of said sleeves 85 is adapted to be disposed within the interior of one of the aforesaid box-like members 77, the end walls of the latter being preferably partially cut away to permit the cable C to be freely extended therethrough and to the next trolley member of said conveyor.

With the cable C connected to a suitable source of power (not herein shown), and moved along the guide track, each of the sleeves 85 will strike against the inside face of the end wall of its associated box-like member 77 located forwardly of said sleeve, or in the direction of movement of said cable, said engaging parts thereby causing the movement of the trolley member therewith along said guide track.

With the instant embodiment of trolley member mounted within a guide track of the type such as is disclosed in the track embodiments of FIGS. 2 and 5, it will be seen that the cable C will be located substantially centrally between the guide track rail members, preferably exteriorly of their lowermost edges. With this construction therefore, it will be realized that said cable C is thereby prevented from becoming entangled with the guide track and that visual inspection and/or maintenance of the said cable C may be readily obtainable.

It is now apparent that in each of the conveyor trolley members as herein described, utilizing a ball bearing type of frictionless bearing means engageable with grooved trackways provided on a guide track and extending longitudinally therealong, and having a corresponding transverse radial configuration to said bearing means, substantially large load bearing surfaces are made available for supporting and transmitting the load carried by said trolley members to said track.

It will be further realized that with the grooved trackways formed on opposite sides of the guide track, and on at least one or more levels within the latter, and wherein the said trackways are in close engagement with the trolley member bearing means, extending partially around the trackway engaging balls thereof, portions of said surfaces act as retention surfaces and hence prevent the trolley member from being swung within the aforesaid guide track as it is moved therealong.

It will also be realized that the several components of the conveyor systems as are described herein, readily adapt said systems for conveying articles in a vertical and/or horizontal transporting plane or any conveyance plane angularly disposed therebetween.

Having thus described in detail herein several preferred forms, it is to be understood that the conveyor of the present invention is susceptible to various changes, modifications and arrangements of parts without departing from the inventive concepts as are defined in the claims.

What is claimed is:

1. An article conveyor, comprising a guide track, an article trolley member having means defining at least two endless ball races thereon and disposed in parallel spaced relation to each other, a plurality of balls in each of said races, said guide track having at least a pair of ball receiving grooved trackways formed one above the other on opposite sides thereof and extending longitudinally therealong in parallel spaced relation one to the other, said trolley member being movably carried within said guide track with the balls of one of said races being received within one of said trackways, and the balls of the other of said races being received within the other of said trackways, said balls in each of said races rotatably moving over its associated trackway while moving along said endless race to thus convey said trolley member along said drive track.

2. In an article conveyor as is defined in claim 1 and wherein a hanger bracket is carried by said trolley member and suspended between said trackways for supporting an article thereon.

3. In an article conveyor as is defined in claim 2 and wherein the endless ball races are disposed one above the other in overlapping relation to each other and the vertical center line of the trolley member.

4. An article conveyor, comprising a guide track, an article trolley member having means defining two planar endless ball races thereon and disposed in parallel spaced relation to each other, a plurality of balls in each of said races, said guide track having at least a pair of grooved trackways formed thereon, said trolley member being movably carried within said guide track with the balls of one of said races being accommodated within one of said trackways and the balls of the other of said races being accommodated within the other of said trackways, and said trackways having a transverse arcuate configuration corresponding to that configuration of the balls therein to be thus in close engagement therewith, said balls in each of said races rotatably moving over its associated trackway while moving along said endless race to thus convey said trolley member along said guide track.

5. An article conveyor as defined in claim 4 and wherein each of said grooved trackways includes a load bearing surface effective to suspend said trolley member on said trackways.

6. An article conveyor as defined in claim 4 and wherein each of said grooved trackways includes a retention surface effective to retain said trolley member in said guide track.

7. An article conveyor, comprising a guide track, a plurality of article trolley members each having means defining two planar endless ball races thereon disposed in parallel spaced relation to each other, a plurality of balls in each of said races, said guide track having at least a pair of ball receiving grooved trackways formed one above the other on opposite sides thereof and extending longitudinally therealong in parallel spaced relation one to the other, said trolley members being movably carried within said guide track with the balls of one of said races being received within one of said trackways, and the balls of the other of said races being received within the other of said trackways, means interconnecting said trolley members for moving the same along said trackways, and said balls in each of said races rotatably moving over its associated trackway while moving along said race to thus convey its respective trolley member along said trackways.

8. An article conveyor as defined in claim 7 and wherein the means interconnecting the trolley members comprises lengths of link chain each of which is connected at its ends to adjacent trolley members.

9. An article conveyor as defined in claim 7 and wherein the means interconnecting each of the trolley members comprises a predetermined length of flexible cable.

References Cited in the file of this patent

UNITED STATES PATENTS

| | | |
|---|---|---|
| 827,829 | Thomas | Aug. 7, 1906 |
| 1,328,523 | Jordan | Jan. 20, 1920 |
| 1,949,691 | Neher et al. | Mar. 6, 1934 |
| 1,959,172 | McIlrath | May 15, 1934 |
| 2,134,755 | Frank et al. | Nov. 1, 1938 |
| 2,146,289 | Doyle | Feb. 7, 1939 |
| 2,184,860 | Barrett | Dec. 26, 1939 |
| 2,660,291 | Daigle | Nov. 24, 1953 |
| 2,920,581 | Cook et al. | Jan. 12, 1960 |
| 2,937,601 | Guirl et al. | May 24, 1960 |